Patented Feb. 5, 1924.

1,482,952

UNITED STATES PATENT OFFICE.

JAMES HERBERT STEDMAN, OF BRAINTREE, MASSACHUSETTS.

REENFORCED-RUBBER FLOORING AND PROCESS OF MAKING THE SAME.

No Drawing. Application filed October 4, 1922. Serial No. 592,423.

*To all whom it may concern:*

Be it known that I, JAMES HERBERT STEDMAN, a citizen of the United States, residing at Braintree, in the county of Norfolk and State of Massachusetts, have invented certain new and useful Improvements in Reenforced-Rubber Flooring and Processes of Making the Same, of which the following is a specification.

This invention relates to the manufacture of sheet rubber compounds, and more especially to the production of a variegated vulcanized rubber sheet which may be used for various purposes but which is particularly useful for flooring, and to a novel process of making the rubber sheet.

Heretofore rubber sheets have been prepared for use as flooring having a surface, produced by vari-colored rubber, which is intended to simulate the graining on wood, the veining of marble, or the color effects of the well-known paisley shawl, an early example of which is the process described in the expired United States patent to Joseph Beck, No. 90,335, dated May 25, 1869. In such sheeting the rubber stocks are formed into a homogeneous sheet by being passed through heated rolls which, because of their rolling pressure, cause the streaks of color to show on the surface in generally parallel streaks, or striated form, extending in the direction of feed, or longitudinally of the sheet as it is finally delivered from the calender.

In the process described by said Joseph Beck and as it since has been practised commercially the ingredients of the composition have been confined to rubber, either crude or reclaimed, or a combination of both, colored as may be desired. With such material it has been found to be extremely difficult to cause the vari-colored stocks to blend in a manner to obtain a faithful reproduction of the surface effects hereinbefore named. I have discovered that the difficulty encountered lies in the fact that while the mill-mixing and calendering processes develop a grain in the stock, this developed grain is not of itself sufficient to cause an association of the vari-colored stocks in the proper manner to create the desired effects.

The colors, having no component flow retardative element in the compound, will readily flux, producing a color blur instead of the desired distinct mottle. Briefly, the stock needs reinforcing.

One object of the present invention is to improve the process of making rubber sheeting, of the character hereinbefore described, in such manner that the individuality of the various colors used is retained to a substantial extent in the finished article, the amalgamation and association being so controlled that the fine grained, veined or like appearance, so greatly desired, is successfully created and retained.

A further object of the invention is to produce a variegated vulcanized rubber flooring, or the like, of blended rubber color stocks which have as a component reinforcement a cotton or like fibre that has been mechanically finely comminuted and intimately associated with each color stock. When such color stocks are mixed, the reinforcement of cotton fibre in the condition described, so controls the movement of the colors during their mingling as to cause a resistance to amalgamation and thus retaining their color identities under a sufficiently prolonged period of mixing to form the fine grained or striated surface effects so much to be desired. Color stocks without fibre reinforcement blend readily into blurred masses under repeated rolling on a mixing mill, and the surface produced does not have the distinctive color effects obtained by the use of fibre reinforcement, which effectually prevents such an interflow of the colors as to obscure their individuality, thus producing a clearly marked striated design instead of a smutty blur of color streaks.

The nature of the novel method will be indicated, for illustrative purposes, by a description of its practice in manufacturing flooring, and the true scope of the invention will then be particularly pointed out in the appended claims.

In practising the preferred process for making flooring I first pass accumulations of rubber stock, which may conveniently be uncured friction scrap, through a cracker which kneads or combines the loose stock and delivers it in matted form. The friction scrap may be the waste from tire manufacture, both cord and fabric, and may also include the waste from hose, belting or in fact any uncured rubber waste having a contained fibre of cotton or its equivalent. The operation at the cracker masticates the cotton fibre but does not disintegrate it, and the stock is brought to a form for convenient handling and division into smaller quantities. This material will hereinafter be termed "friction."

The matted friction is then mixed, by weight, with rubber, pigment and compounding ingredients in accordance with a selected formula, which may vary. A specific definition of the formula used is, therefore, not necessary to a complete understanding of the present invention. The rubber used in filling the formula may be all crude, all reclaimed, or a mixture of both. In practice a mixture has been found satisfactory, but the scope of the invention is not limited to the use of a mixture. Hereinafter the rubber content of the colored batch will be described simply as "rubber", whatever its composition. The materials thus assembled are then passed through a mixing mill such as a Banbury or other patent mixer, which has some chewing-up effect and a certain grinding effect. The friction is reduced to pieces approximating the size of one's palm and smaller, and is thoroughly distributed throughout the batch, and in some instances squeezed into it.

The batch delivered from the mixing mill is then taken to a sheeting mill, of usual construction, which is operated in a manner to bring the batch to a rough sheet, say about one-quarter of an inch in thickness in which the nature of the cotton fibre has not been materially changed, but it has become thoroughly mixed throughout the body of the sheet.

The sheet thus formed is then passed a sufficient number of times through a refining mill, of usual construction, so designed that the cotton fibre in the sheet is completely shredded and thoroughly distributed. This operation in order to obtain the most perfect results is continued until the sheet is brought to practically paper thickness, in which the shredded cotton fibre may be broken down to a tissue. The operation here further distributes the shredded fibre throughout the mass, due to manipulation of the material as by folding as it is fed to the mill, but without the individual pieces retaining any concerted position or common direction to produce a distinct grain.

It will be understood that the usual refining mill referred to above is a differential action mill which serves to draw out the sheet, the rubber at one side of the sheet flowing faster than the rubber at the opposite side of the sheet. The result, therefore, of passing the sheet repeatedly through a mill of this type until the sheet is thinned down to paper thickness is that the spun cotton fiber carried in the waste stuff that is utilized is torn and pulled apart into its natural threads, i. e., lint. These fine short unspun threads will be thoroughly distributed throughout the mass and will be so intimately associated with the colored rubber as to have practically lost to the eye their identity as threads, while at the same time without losing their function as reinforcements as well as their capacity to resist interflow of the colors when a plurality of differently-colored batches are mixed.

The color stock produced by practising the process being described is now ready for the final mixing and calendering. It will be understood that numerous batches are produced in this way each having its own distinct color, and in this art "white" and "black" are both classed as colors. The different colored compounds in the selection desired for the particular flooring to be made are warmed up separately, preferably being brought to almost a soft mastic state. In this condition the various batches of compounded rubber selected, each containing refined friction are mixed together on the warming mill preparatory to calendering. A greater quantity of one colored compound is used to form a base color for the flooring, this being selected in accordance with the design or type of flooring to be produced. This operation forms a rough blend of the colors throughout the body or base color, and they with the cotton fibre shreds extending throughout the mass, are drawn into more or less parallel relation, i. e., a distinct grain is being developed, the formation of which is materially promoted and aided by the presence of the cotton fibre which is an integral, component part of the material.

The sheet delivered from the warming mill is thicker than is desired, and the blending of the colors is not completed. Hence a final mill operation is required to perfect the modeling of the design and strengthen the material. This final sheeting and finishing operation is by calendering. The calendering operation continues the development of the grain by drawing the shreds, to which state the cotton fibre has been reduced, longitudinally of the sheet being formed or lengthwise the direction of feed of the sheet through the calender. The drawing of the cotton fibre into the generally parallel relation described acts to modify and control the lengthwise extension of the various colors in the sheet, the resultant effect of which is a grained or similar surface on the sheet in which each color has its own individuality and yet mingles with the others in a distinctive and novel manner. The contained fibre in the various batches used in the whole mass influences and controls the direction of movement of the individual colors in a manner to cause them to resist amalgamation and association with each other, thus obtaining a fine color grain which stands out distinctly in contradistinction to the blurred or smutted appearance of the surface when the same compounded rubbers are used, but without the addition of friction or otherwise introducing cotton or like fibre having an equivalent function.

While it is preferred to impregnate the compounded batch with cotton fibre by the introduction of friction scrap and the like, as hereinbefore described, it will be understood by those skilled in the art that any fibre, such as spun, raw or cleaned cotton, or even cotton waste, as a separate element, may be introduced into the batch with an equivalent final result, it being merely necessary to revise the formula by increasing the rubber content. It will be recognized by those skilled in the art that the important consideration is the incorporation in the color compound of a fibrous reinforcing medium, of a form and character that will function to resist or retard an interflow of colors during the period of mixing required to reduce such of the colors to masses of relatively small bulk as may be requisite to form the desired mottled appearance of the finished flooring, which reinforcement, as heretofore stated, may be introduced in the form of friction or otherwise as may be found convenient or expedient. It is obvious that in the future practice of the invention such changes may be made as do not involve departure from the scope of my invention, as claimed.

The sheet produced by the calendering process is then deposited in a vulcanizing mould or press and cured in the usual way.

The cured sheet is severed, as may be desired, to make flooring tiles, or it may be utilized as a whole as a floor or wall covering, or for any other analogous purpose.

I believe that I am the first to discover the importance in making rubber flooring, or the like, of combining different colored fibre-bearing rubber compounds or batches with a final result of mingling the compounds without losing individual identities.

The nature and characteristics of the novel variegated vulcanized rubber sheet having been specifically described and the preferred method if its manufacture having been explained, what is claimed as new, is:

1. A variegated vulcanized rubber flooring, or the like, composed of a plurality of rubber color stocks, each of a different color, distinctively mingled with each other, said plurality of color stocks having as a component reinforcement a cotton or like fiber mechanically so finely comminuted and intimately associated with each color stock as to cause a resistance to amalgamation of the color stocks and thus retaining their individual identities under such a prolonged mixing as would cause unreinforced rubber color stocks to blend into blurred masses.

2. The method of making a variegated rubber flooring, or the like, which comprises forming a plurality of batches of unvulcanized rubber compound, in each of which cotton or like fiber is a component part and each of which has its own distinctive color, treating said batches separately in a manner to mechanically comminute the contained fiber and at the same time cause an intimate and uniform mixture of the fiber and the rubber, then mixing together the plurality of color batches thus prepared by rolling the batches into a sheet, the association of the fiber and rubber being so intimate and the fiber being so finely comminuted as to serve to resist interflow of the separate colors sufficiently to permit repeated rolling operations without losing color identities and thus obtain a desirable striated design, and then vulcanizing the sheet.

3. The method of making a variegated rubber flooring, or the like, which comprises forming a plurality of batches of unvulcanized rubber compound, in each of which cotton or like fibre is a component part and each of which has its own distinctive color, subjecting each batch separately and repeatedly to the action of a differential rolling mill until the contained fiber is reduced to minute shreds and evenly distributed throughout the compound, then mixing together a plurality of the batches thus prepared to form a variegated sheet, this mixing together of the batches being done by repeatedly rolling the combined batches until the desired striation of the pattern is obtained, the shredding operation in the differential mill being repeated a sufficient number of times to so finely shred the fiber and intimately associate it with the rubber as to serve to resist interflow of color during this pattern-forming operation, then calendering the mixture, and finally vulcanizing the calendered sheet.

4. The method of making vulcanized rubber flooring, or the like, which comprises treating a compound of unvulcanized rubber, cotton fiber and pigment in a manner to mix the pigment and fiber throughout the compound, then repeatedly folding and passing the mixed batch through a refining mill the heavy pressure and differential action of which tears the fiber into minute shreds and distributes the fibre throughout the batch as it is shredded, a fine comminution of the fiber and its intimate association with the rubber being accomplished by continuing the refining of the batch until it is reduced to a sheet of substantially paper thickness, then mixing a plurality of such batches each of a distinctive color to form a variegated sheet in which the interspersed fiber, in the condition described, causes the colors to resist amalgamation under prolonged mixing with a final result of mingling without losing color identities, and then vulcanizing the sheet.

5. The method of manufacturing variegated rubber sheets, consisting in making up separately a plurality of batches of stock each of which is treated in the following manner:—masticating uncured rubber and textile fiber threads into matted condition, then subjecting this matted mass together with color pigment and unvulcanized rubber compound to the action of a mixing mill, then rough sheeting the colored mass, then passing this rough sheet through a refining mill a sufficient number of times to completely shred the fiber and reduce the mass to thin sheets; then combining the plurality of batches and mixing and rolling them into a variegated sheet, then calendering the sheet, and finally vulcanizing the calendered sheet.

6. A vulcanized rubber flooring, or the like, characterized by a variegated surface exhibiting a plurality of mingled color stocks, of which one is of greater quantity and forms a base or background, with the remainder distributed therethrough in masses of relatively small bulk, the colors mingling with each other, but distinctly retaining the individual color identity of each, the whole forming a striated pattern; and further characterized by an internal reinforcement of mechanically comminuted cotton, or like fibre, so finely comminuted and so intimately associated with the colored rubber as to form a component color interflow retardative medium.

7. The method of making a variegated vulcanized rubber flooring, or the like, which comprises separately producing a plurality of color batches each composed of unvulcanized rubber, compounding ingredients, a cotton or like fibre mechanically reduced to a finely comminuted condition, and pigment, the color-controlling pigment in each color batch being of a different color, and the fibre being in such a fine state of comminution, and so thoroughly mixed throughout the colored rubber and forced so intimately into association therewith by repeatedly running the batch through a differential action mill, that on thereafter thoroughly mixing together a selected number of said batches with another of greater quantity and different color which forms a base color, and sheeting out the variegated mass, the batches of less quantity will be distributed throughout the base color in masses of relatively small bulk and mingled therewith substantially without flux or flow, producing a vari-colored sheet in which color identities are distinctly retained due to the resistance to color interflow effected by the intimate association of the finely comminuted fibre with the colored rubber as aforesaid, performing said mixing and sheeting operations, and finally vulcanizing the vari-colored sheet.

JAMES HERBERT STEDMAN.